(12) United States Patent
Oka et al.

(10) Patent No.: US 11,326,598 B2
(45) Date of Patent: May 10, 2022

(54) COMPRESSOR

(71) Applicant: Panasonic Intellectual Property Management Co., Ltd., Osaka (JP)

(72) Inventors: Hideto Oka, Shiga (JP); Daisuke Funakoshi, Shiga (JP); Akinori Fukuda, Shiga (JP); Kenji Watanabe, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 108 days.

(21) Appl. No.: 16/652,921

(22) PCT Filed: Oct. 1, 2018

(86) PCT No.: PCT/JP2018/036625
§ 371 (c)(1),
(2) Date: Apr. 1, 2020

(87) PCT Pub. No.: WO2019/077979
PCT Pub. Date: Apr. 25, 2019

(65) Prior Publication Data
US 2020/0232461 A1 Jul. 23, 2020

(30) Foreign Application Priority Data
Oct. 20, 2017 (JP) .............................. JP2017-203074

(51) Int. Cl.
*F04C 18/02* (2006.01)
*F04C 23/00* (2006.01)
*F04C 29/12* (2006.01)

(52) U.S. Cl.
CPC ........ *F04C 18/0215* (2013.01); *F04C 23/008* (2013.01); *F04C 18/0261* (2013.01);
(Continued)

(58) Field of Classification Search
CPC F04C 18/0215; F04C 18/0261; F04C 23/008; F04C 28/26; F04C 29/12;
(Continued)

(56) References Cited

U.S. PATENT DOCUMENTS

| 5,855,475 A * | 1/1999 | Fujio ...................... F04C 28/26 |
| | | 418/15 |
| 10,400,772 B2 * | 9/2019 | Sun ...................... F04C 18/0215 |
| 2002/0114720 A1 * | 8/2002 | Itoh ...................... F04C 29/126 |
| | | 418/55.2 |

FOREIGN PATENT DOCUMENTS

| CN | 102042224 A | 5/2011 |
| JP | 58-006053 U | 1/1983 |

(Continued)

OTHER PUBLICATIONS

English Translation of Chinese Search Report dated May 8, 2021 for the related Chinese Patent Application No. 201880067412.3, 2 pages.

(Continued)

*Primary Examiner* — Audrey B. Walter
*Assistant Examiner* — Dapinder Singh
(74) *Attorney, Agent, or Firm* — Hamre, Schumann, Mueller & Larson, P.C.

(57) ABSTRACT

A compressor includes: a fixed scroll; at least one discharge port; a reed valve; a valve stop; and a ventilation hole. The at least one discharge port is disposed in the fixed scroll. The reed valve is disposed in the fixed scroll so as to block the at least one discharge port. The valve stop is disposed in the fixed scroll, and restricts the lift amount of the reed valve. The ventilation hole is disposed in the valve stop. In the present aspect, the flow of refrigerant gas is smoothed to suppress the compression loss, and the force applied to the reed valve can be suppressed. As a result, the efficiency and reliability can be improved.

6 Claims, 4 Drawing Sheets

(52) U.S. Cl.
CPC .......... *F04C 29/12* (2013.01); *F04C 2210/26* (2013.01); *F04C 2240/30* (2013.01); *F04C 2240/40* (2013.01)

(58) Field of Classification Search
CPC  F04C 29/128; F04C 2210/26; F04C 2240/30; F04C 2240/40; F16K 15/16
See application file for complete search history.

(56) References Cited

FOREIGN PATENT DOCUMENTS

| | | |
|---|---|---|
| JP | 2001-329975 A | 11/2001 |
| JP | 2003-328965 | 11/2003 |
| JP | 2015-129476 | 7/2015 |

OTHER PUBLICATIONS

International Search Report issued in International Application No. PCT/JP2018/036625, dated Dec. 25, 2018, 4 pages with translation.
English Translation of Chinese Search Report dated Dec. 29, 2021 for the related Chinese Patent Application No. 201880067412.3, 2 pages.

* cited by examiner

COMPRESSOR

TECHNICAL FIELD

The present disclosure relates to a compressor used for a heating/cooling air conditioner, a cooling device such as a refrigerator, or a heat-pump-type water heater.

BACKGROUND ART

In a conventional hermetic compressor used for a cooling device or a water heater, refrigerant gas returning from a refrigeration cycle is supplied via a suction channel to a compression chamber formed in a compression mechanism. The refrigerant gas that has been compressed to high temperature and high pressure is discharged from the compression mechanism into a closed container, and is fed from a discharge pipe disposed in the closed container into the refrigeration cycle (e.g., see Patent Literature 1).

FIG. 4A is a sectional view of a conventional scroll compressor disclosed in Patent Literature 1. FIG. 4B is a plan view of fixed scroll 106 in the conventional scroll compressor. As shown in FIG. 4A and FIG. 4B, refrigerant gas of low temperature and low pressure is guided to compression chamber 109 via suction pipe 110 and suction chamber 111, and is compressed by the change in volume of compression chamber 109.

Discharge ports 112 are disposed in a center of fixed scroll 106. Reed valve 113 is disposed in fixed scroll 106 so as to block discharge ports 112. Muffler space 114 is formed in muffler 116 covering the upside of fixed scroll 106.

The compressed refrigerant gas of high temperature and high pressure passes through discharge ports 112 to press and open reed valve 113, and is discharged to muffler space 114. Then, the refrigerant gas of high temperature and high pressure passes from muffler space 114 through discharge pipe 117, and is fed to the refrigeration cycle.

In order to prevent an excessive deformation from damaging reed valve 113, valve stop 124 for restricting the lift amount (valve opening) of reed valve 113 is disposed near the center of the upper surface of fixed scroll 106.

CITATION LIST

Patent Literature

PTL 1: Unexamined Japanese Patent Publication No. 2003-328965

SUMMARY OF THE INVENTION

In a conventional compressor, however, valve stop 124 restricts the area of the channel of refrigerant gas when the refrigerant gas goes out via reed valve 113. Muffler space 114 is also narrow, so that the refrigerant gas coming from discharge ports 112 are hard to pass through it. As a result, compression loss increases.

The present disclosure addresses the conventional problem, and provides a compressor of an efficiency increased by the suppression of the compression loss.

A compressor of one aspect of the present disclosure includes: a fixed scroll; at least one discharge port; a reed valve; a valve stop; and a ventilation hole. The at least one discharge port is disposed in the fixed scroll. The reed valve is disposed in the fixed scroll and opening and closing the at least one discharge port. The valve stop is disposed in the fixed scroll, and restricts the lift amount of the reed valve. The ventilation hole is disposed in the valve stop.

In the present disclosure, the flow of the refrigerant gas is smoothed to suppress the compression loss, and the force applied to the reed valve can be suppressed. As a result, the efficiency and reliability can be improved.

DESCRIPTION OF EMBODIMENT(S)

A compressor of a first aspect of the present disclosure includes: a fixed scroll; at least one discharge port; a reed valve; a valve stop; and a ventilation hole. The at least one discharge port is disposed in the fixed scroll. The reed valve is disposed in the fixed scroll and opening and closing the at least one discharge port. The valve stop is disposed in the fixed scroll, and restricts the lift amount of the reed valve. The ventilation hole is disposed in the valve stop.

A compressor of a second aspect of the present disclosure, in addition to the first aspect, includes the configuration in which the at least one discharge port has a plurality of discharge ports, and a ventilation hole is disposed between two adjacent discharge ports, of the plurality of discharge ports.

A compressor of a third aspect of the present disclosure, in addition to the first aspect, includes the configuration in which a ventilation hole is disposed in a part of the valve stop that does not come into contact with the reed valve.

A compressor of a fourth aspect of the present disclosure, in addition to the first aspect, includes the configuration in which a ventilation hole is disposed in parallel with the reed valve.

Hereinafter, the exemplary embodiment of the present disclosure is described with reference to the accompanying drawings.

Figure 1:
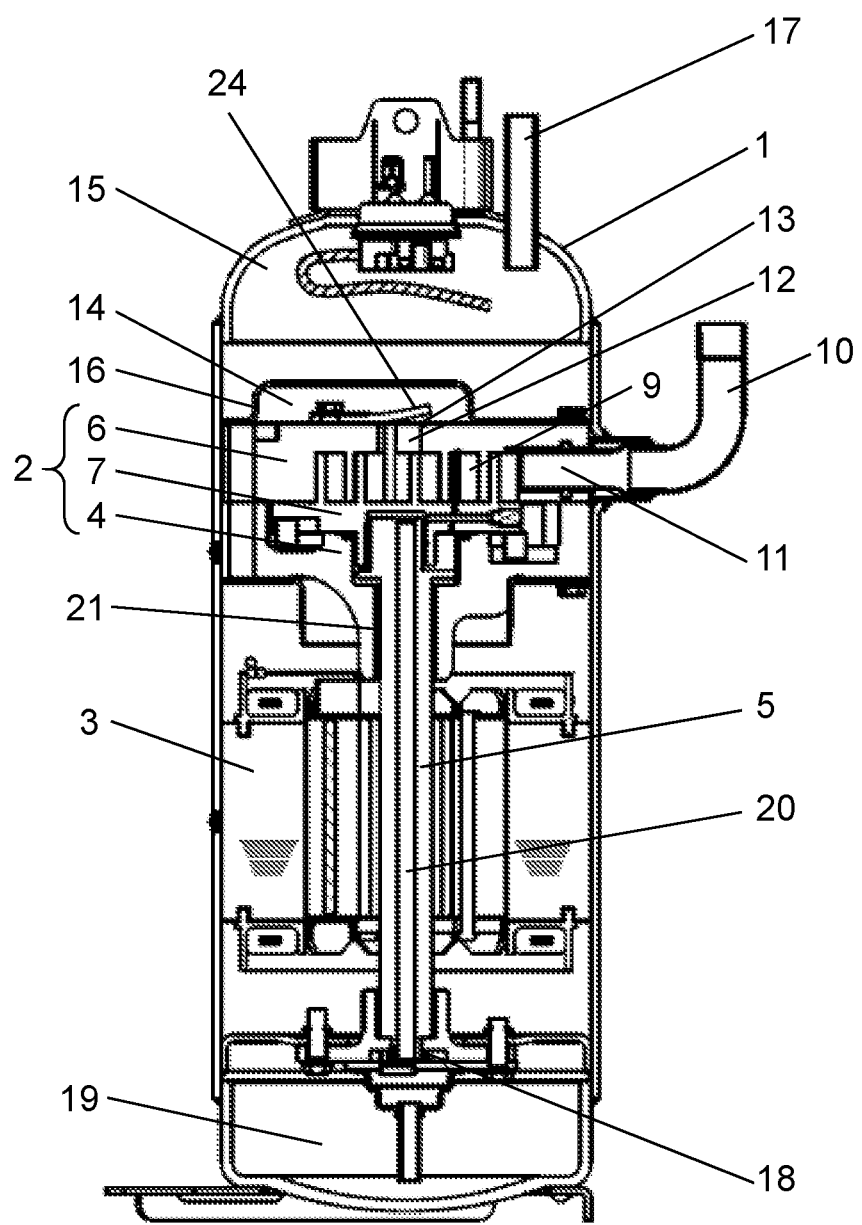
FIG. 1 is a sectional view of a compressor in accordance with an exemplary embodiment of the present disclosure.
Figure 2:
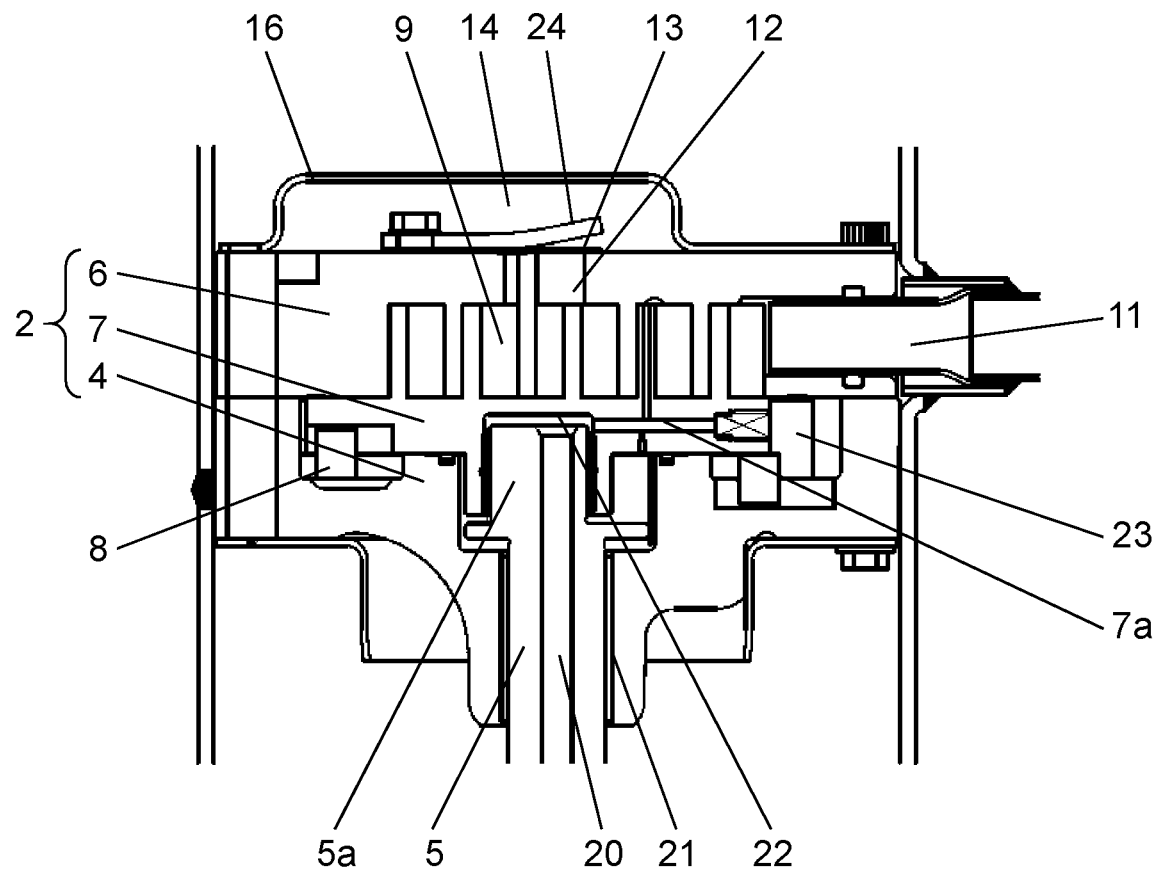
FIG. 2 is an enlarged sectional view showing an essential part of the compressor in accordance with the exemplary embodiment.

FIG. 1 is a sectional view of a compressor in accordance with the present exemplary embodiment. FIG. 2 is an enlarged sectional view showing an essential part of the compressor in accordance with the exemplary embodiment.

As shown in FIG. 1, the compressor in accordance with the exemplary embodiment includes compression mechanism 2 and electric motor 3 that are disposed in closed container 1.

Main bearing member 4 is fixed to the inside of closed container 1 by welding or shrink fitting. Main bearing member 4 pivotally supports shaft 5. Fixed scroll 6 is attached on main bearing member 4 with a bolt. Scroll-type compression mechanism 2 is formed by sandwiching orbiting scroll 7, which is engaged with fixed scroll 6, between fixed scroll 6 and main bearing member 4. Compression chamber 9 is formed between fixed scroll 6 and orbiting scroll 7.

As shown in FIG. 2, rotation restraint mechanism 8 is disposed between orbiting scroll 7 and main bearing member 4. Rotation restraint mechanism 8 is formed of an Oldham ring or the like that prevents the rotation of orbiting scroll 7 and moves orbiting scroll 7 in circular orbit. Eccentric shaft 5a is disposed at the upper end of shaft 5.

When eccentric shaft 5a eccentrically drives orbiting scroll 7, orbiting scroll 7 moves in circular orbit. Thus, the volume of compression chamber 9 is reduced and the refrigerant gas in compression chamber 9 is compressed.

Through this operation, the refrigerant gas is sucked from suction pipe 10 via suction chamber 11 into compression chamber 9. Suction pipe 10 is connected to the refrigeration cycle outside closed container 1. Suction chamber 11 is disposed in fixed scroll 6 that is disposed between suction pipe 10 and compression chamber 9, and always has suction pressure.

The refrigerant gas having been compressed to a predetermined pressure passes through discharge port 12 to press and open reed valve 13, and is discharged out of compression chamber 9. Discharge port 12 is disposed in the center of fixed scroll 6. In the present exemplary embodiment, three discharge ports 12 are disposed (see FIG. 3A). Reed valve 13 is disposed on the upper surface of fixed scroll 6 so as to block discharge ports 12.

The refrigerant gas having passed through reed valve 13 is discharged to muffler space 14, and is fed to the refrigeration cycle via container space 15 and discharge pipe 17 (see FIG. 1). Muffler space 14 is a space covered with muffler 16 attached on the upper surface of fixed scroll 6.

In order to prevent an excessive deformation from damaging reed valve 13, valve stop 24 for restricting the lift amount (valve opening) of reed valve 13 is disposed near the center of the upper surface of fixed scroll 6.

As shown in FIG. 1, pump 18 is disposed at the lower end of shaft 5 for rotating and driving orbiting scroll 7. Pump 18 is disposed so that its suction port is positioned in oil reservoir 19 that is disposed in the bottom of closed container 1.

Pump 18 is driven simultaneously with a scroll compressor. Therefore, pump 18 certainly sucks oil in oil reservoir 19 regardless of the pressure condition or operation speed.

The oil sucked by pump 18 is supplied to compression mechanism 2 through oil supply hole 20 penetrating shaft 5. When a foreign matter is removed from the oil using an oil filter or the like before or after the oil is sucked by pump 18, the foreign matter can be prevented from entering compression mechanism 2.

The pressure of the oil guided to compression mechanism 2 is substantially equal to the discharge pressure of the scroll compressor, and also acts as a back pressure source to orbiting scroll 7. Thus, orbiting scroll 7 does not separate from fixed scroll 6, and stably exerts a predetermined compression function.

A part of the oil, due to the supply pressure or its own weight, enters an engagement portion between eccentric shaft 5a and orbiting scroll 7 and enters bearing portion 21 between shaft 5 and main bearing member 4. The part of the oil lubricates these elements, and then returns to oil reservoir 19.

As shown in FIG. 2, a part of the oil supplied from oil supply hole 20 to high pressure region 22 enters back pressure chamber 23 through channel 7a. Channel 7a is formed in orbiting scroll 7, and has an opening end in high pressure region 22. Rotation restraint mechanism 8 is disposed in back pressure chamber 23.

The oil having entered back pressure chamber 23 lubricates a thrust sliding portion and a sliding portion of rotation restraint mechanism 8, and applies a back pressure to orbiting scroll 7 in back pressure chamber 23.

The refrigerant gas compressed by compression mechanism 2, as discussed above, passes through discharge port 12 and reed valve 13, and is discharged to muffler space 14. Valve stop 24 restricts the area of the channel of the refrigerant gas when the gas goes out through reed valve 13. Muffler space 14 is also narrow, so that the refrigerant gas is hard to pass through it.

Figure 3A:
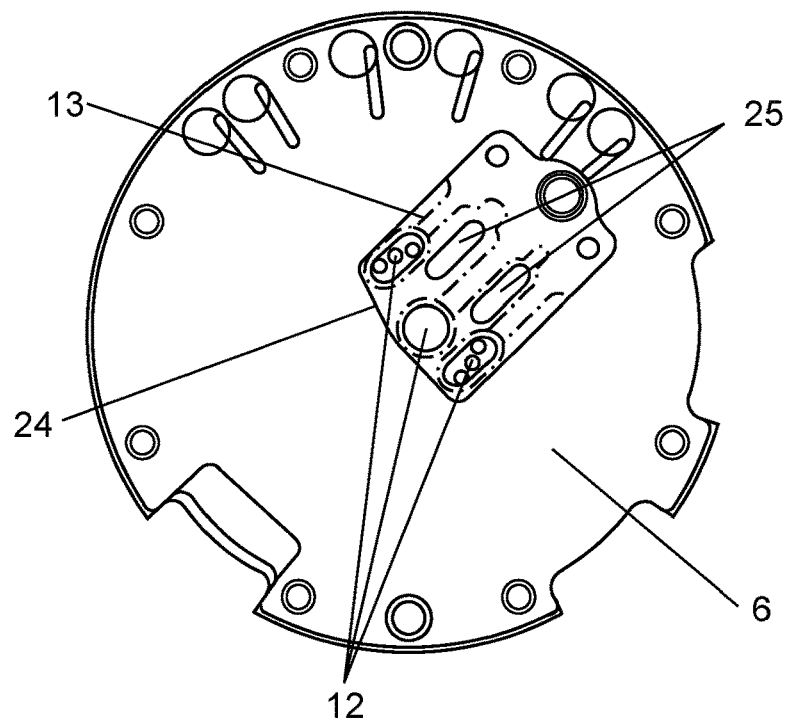
FIG. 3A is a plan view of a fixed scroll in the compressor in accordance with the exemplary embodiment.
Figure 3B:
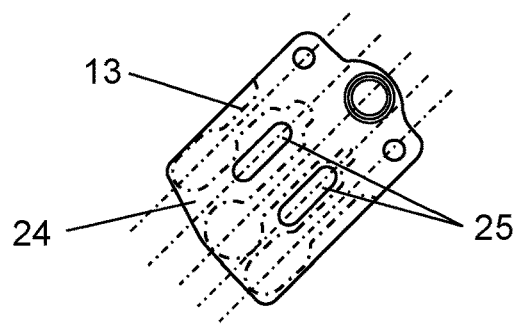
FIG. 3B is a diagram showing the positional relationship between a reed valve and a ventilation hole.
Figure 3C:
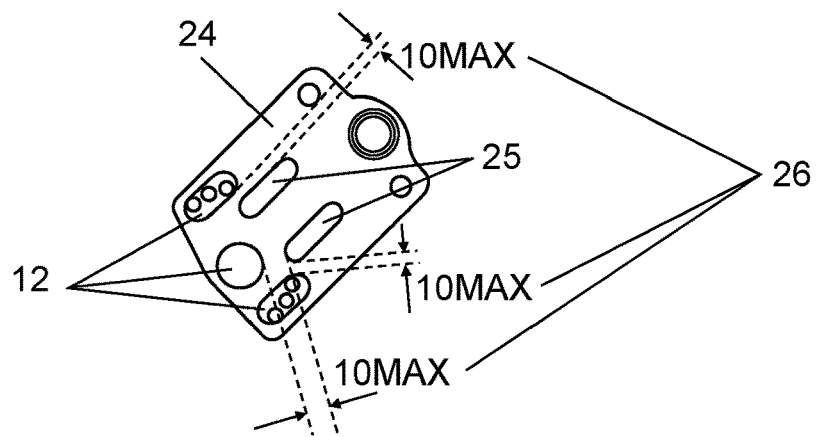
FIG. 3C is a diagram showing the distance between a discharge port and the ventilation hole.
Figure 4A:
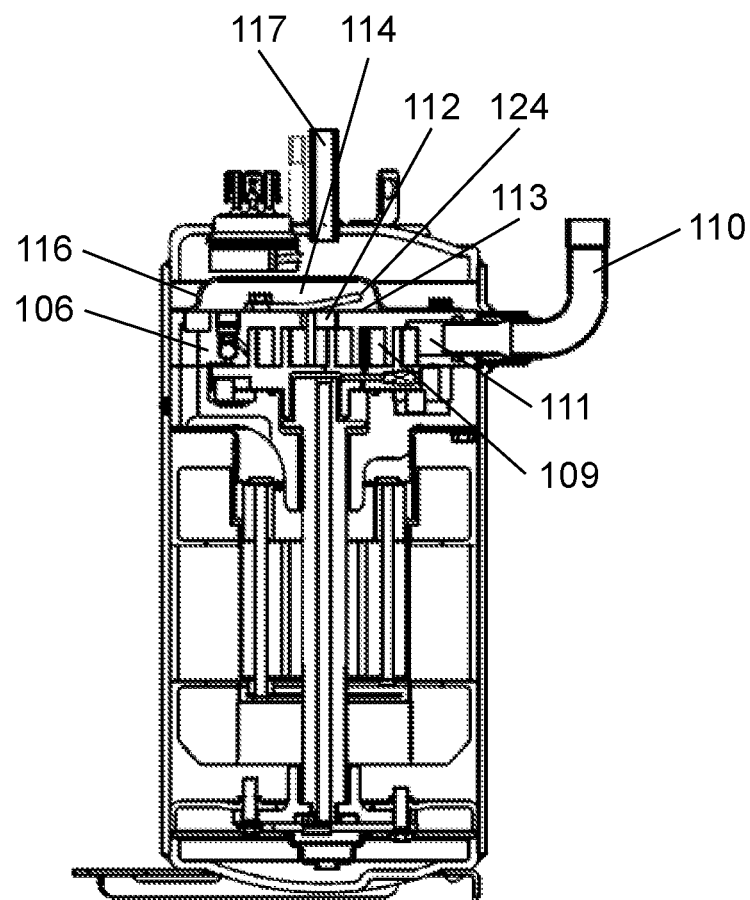
FIG. 4A is a sectional view of a conventional scroll compressor.
Figure 4B:
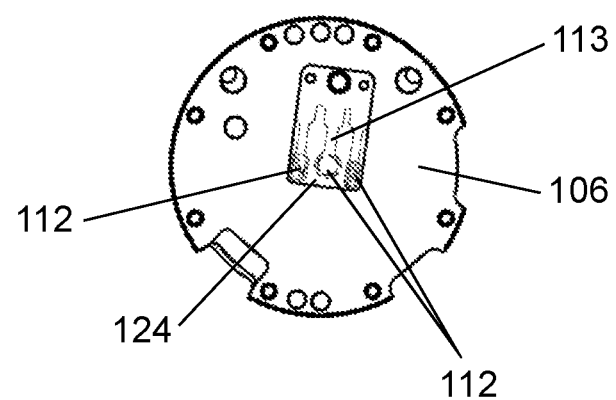
FIG. 4B is a plan view of a fixed scroll in the conventional scroll compressor.

FIG. 3A is a plan view of a fixed scroll in the compressor in accordance with the exemplary embodiment. FIG. 3B is a diagram showing the positional relationship between reed valve 13 and ventilation holes 25. FIG. 3C is a diagram showing the distances between discharge ports 12 and ventilation holes 25.

As shown in FIG. 3A to FIG. 3C, in the present exemplary embodiment, ventilation holes 25 as channels of the refrigerant gas are disposed in valve stop 24. Specifically, each ventilation hole 25 has a slot shape including a rectangular portion and circular arc portions. Each of the circular arc portions is disposed at a respective one of two short edges of the rectangular portion. Ventilation holes 25 increase the area of the channel of the refrigerant gas. As a result, the refrigerant gas flows smoothly to suppress the compression loss.

Each ventilation hole 25 is disposed between two adjacent discharge ports 12. Thus, even when any one of three discharge ports 12 opens, the compression loss can be effectively suppressed.

Forming ventilation holes 25 can suppress the force applied to reed valve 13. Therefore, the efficiency and reliability can be improved.

Ventilation holes 25 are disposed in a part of valve stop 24 that does not come into contact with reed valve 13. Thus, ventilation holes 25 do not interfere with reed valve 13. Therefore, the damage of reed valve 13 that may be caused when reed valve 13 comes into contact with a periphery of ventilation holes 25 can be prevented. As a result, the efficiency and reliability can be improved.

Ventilation holes 25 each having a slot shape are disposed in parallel with reed valve 13. Thus, the area of the channel of the refrigerant gas can be further increased. As a result, the refrigerant gas flows more smoothly and can suppress the compression loss.

A maximum of the distances between ventilation holes 25 and discharge ports 12 is 10 mm (see, A dimensions 26 shown in FIG. 3C). Thus, refrigerant gas more easily passes. As a result, the refrigerant gas flows more smoothly, and can suppress the compression loss.

In the present exemplary embodiment, three discharge ports 12 are disposed. However, two or four or more discharge ports 12 may be disposed.

INDUSTRIAL APPLICABILITY

As discussed above, a compressor of the present disclosure can suppress the compression loss by smoothing the flow of refrigerant gas, and can suppress the force applied to a reed valve. As a result, the efficiency and reliability can be improved. The compressor of the present disclosure can be applied to various apparatuses used for the refrigeration cycle.

REFERENCE MARKS IN THE DRAWINGS 1 closed container
2 compression mechanism
3 electric motor
4 main bearing member
5 shaft
6, 106 fixed scroll
7 orbiting scroll
8 rotation restraint mechanism
9, 109 compression chamber
10, 110 suction pipe
11, 111 suction chamber
12, 112 discharge port
13, 113 reed valve
14, 114 muffler space
15 container space
16, 116 muffler
17, 117 discharge pipe
18 pump
19 oil reservoir
20 oil supply hole
21 bearing portion
22 high pressure region
23 back pressure chamber
24, 124 valve stop
25 ventilation hole
26 A dimension

The invention claimed is:

1. A compressor comprising:
a fixed scroll;
a discharge port disposed in the fixed scroll;
a reed valve disposed in the fixed scroll and opening and closing the discharge port, the reed valve having a first surface facing the discharge port and a second surface opposite to the first surface;
a valve stop disposed in the fixed scroll and configured to restrict a lift amount of the reed valve; the valve stop being disposed on a second surface side of the reed valve, and
a ventilation hole disposed in the valve stop,
wherein the valve stop includes a portion not overlapping with the reed valve in a planar view of the fixed scroll, and
the ventilation hole is disposed in the portion not overlapping with the reed valve.

2. The compressor according to claim 1, wherein
a plurality of discharge ports are disposed in the fixed scroll, each of the plurality of discharge ports being the discharge port, and
the ventilation hole is disposed between two adjacent discharge ports of the plurality of discharge ports.

3. The compressor according to claim 1, wherein
the ventilation hole is disposed in a part of the valve stop, the part not coming into contact with the reed valve.

4. The compressor according to claim 1, wherein
the ventilation hole is disposed in parallel with the reed valve.

5. The compressor according to claim 1, wherein
a distance between the ventilation hole and the discharge port is equal to or less than 10 mm.

6. The compressor according to claim 1, wherein
the ventilation hole has a slot shape.

* * * * *